United States Patent
Bryson et al.

(10) Patent No.: US 8,427,131 B2
(45) Date of Patent: Apr. 23, 2013

(54) VOLTAGE REGULATION AT A REMOTE LOCATION USING MEASUREMENTS FROM A REMOTE METERING DEVICE

(75) Inventors: Michael B. Bryson, Pullman, WA (US); David E. Whitehead, Pullman, WA (US)

(73) Assignee: Schweitzer Engineering Laboratories Inc, Pullman, WA (US)

( * ) Notice: Subject to any disclaimer, the term of this patent is extended or adjusted under 35 U.S.C. 154(b) by 929 days.

(21) Appl. No.: 12/483,382

(22) Filed: Jun. 12, 2009

(65) Prior Publication Data

US 2010/0318238 A1 Dec. 16, 2010

(51) Int. Cl.
*H01F 29/04* (2006.01)
*G05F 1/14* (2006.01)
*G05F 1/153* (2006.01)
*G05D 17/00* (2006.01)
*H02J 3/00* (2006.01)
*H02J 1/00* (2006.01)

(52) U.S. Cl.
USPC ........... 323/343; 323/255; 323/257; 323/340; 700/298; 700/291; 307/17; 307/103

(58) Field of Classification Search .......... 323/255–258, 323/340–343; 700/297, 298, 291; 307/17, 307/103
See application file for complete search history.

(56) References Cited

U.S. PATENT DOCUMENTS

| | | | |
|---|---|---|---|
| 3,702,379 A | 11/1972 | Peterson | |
| 4,015,206 A | 3/1977 | Huntley | |
| 4,020,396 A | 4/1977 | Gamble | |
| 4,148,087 A | 4/1979 | Phadke | |
| 4,276,605 A | 6/1981 | Okamoto | |
| 4,413,189 A | 11/1983 | Bottom | |
| 4,419,619 A | 12/1983 | Jindrick | |
| 4,420,805 A | 12/1983 | Yamaura | |
| 4,502,086 A | 2/1985 | Ebisaka | |

(Continued)

FOREIGN PATENT DOCUMENTS

| | | |
|---|---|---|
| EP | 0175120 | 8/1992 |
| EP | 0231528 | 3/1994 |

(Continued)

OTHER PUBLICATIONS

Schweitzer III, Four New Digital Relays for Overhead Transmission Line Protection, 12th Annual Western Protective Relay Conference, Oct. 22-24, 1985.

(Continued)

*Primary Examiner* — Bao Q Vu
*Assistant Examiner* — Zekre Tsehaye
(74) *Attorney, Agent, or Firm* — Richard M. Edge

(57) ABSTRACT

Regulation of a remote load center voltage from a local location of a voltage regulator and a voltage regulator control using voltage measurements from the remote load center obtained using a metering device at the load center in communication with the voltage regulator control. The metering device may obtain remote voltage information at the load center and communicate such to the voltage regulator control using a direct communications line, a wide area network, or the like. The communications may include electrical (e.g. copper cable), light (e.g. infrared over fiber optics), radio frequency, or the like. The voltage regulator control may be configured to use local measurements and a line drop compensation algorithm in the event that the remote voltage information becomes unavailable.

37 Claims, 11 Drawing Sheets

U.S. PATENT DOCUMENTS

| | | |
|---|---|---|
| 4,528,611 A | 7/1985 | Udren |
| 4,551,718 A | 11/1985 | Cookson |
| 4,561,120 A | 12/1985 | Andow |
| 4,612,617 A | 9/1986 | Laplace |
| 4,620,257 A | 10/1986 | Sano |
| 4,623,834 A | 11/1986 | Klingbiel |
| 4,630,220 A | 12/1986 | Pickinpaugh |
| 4,672,501 A | 6/1987 | Bilac |
| 4,695,737 A | 9/1987 | Rabon |
| 4,731,689 A | 3/1988 | Nimmersjo |
| 4,821,137 A | 4/1989 | Wilkinson |
| 4,871,971 A | 10/1989 | Jeerings |
| 4,889,383 A | 12/1989 | Jones |
| 4,896,241 A | 1/1990 | Li |
| 4,899,383 A | 2/1990 | Einolf, Jr. |
| 4,935,837 A | 6/1990 | Sun |
| 4,972,290 A | 11/1990 | Sun |
| 5,055,766 A | 10/1991 | McDermott |
| 5,069,521 A | 12/1991 | Hardwick |
| 5,095,399 A | 3/1992 | Terada |
| 5,117,174 A | 5/1992 | Kessler |
| 5,136,233 A | 8/1992 | Klinkenberg |
| 5,185,736 A | 2/1993 | Tyrrell |
| 5,210,443 A | 5/1993 | Kugler |
| 5,218,465 A | 6/1993 | Lebby |
| 5,235,599 A | 8/1993 | Nishimura |
| 5,267,231 A | 11/1993 | Dzieduszko |
| 5,283,781 A | 2/1994 | Buda |
| 5,293,295 A | 3/1994 | Nishitani |
| 5,311,508 A | 5/1994 | Buda |
| 5,315,527 A | 5/1994 | Beckwith |
| 5,317,472 A | 5/1994 | Schweitzer, III |
| 5,341,268 A | 8/1994 | Ishiguro |
| 5,367,426 A | 11/1994 | Schweitzer, III |
| 5,371,736 A | 12/1994 | Evan |
| 5,428,553 A | 6/1995 | Chiba |
| 5,430,598 A | 7/1995 | Rodolfo |
| 5,450,002 A | 9/1995 | Dunk |
| 5,451,923 A | 9/1995 | Seberger |
| 5,455,505 A | 10/1995 | Laplace |
| 5,461,607 A | 10/1995 | Miyagi |
| 5,466,973 A * | 11/1995 | Griffioen ............... 307/17 |
| 5,473,608 A | 12/1995 | Gagne |
| 5,481,532 A | 1/1996 | Hassan |
| 5,500,806 A | 3/1996 | Bellin |
| 5,510,697 A | 4/1996 | Dormer |
| 5,530,338 A | 6/1996 | Beckwith |
| 5,541,498 A | 7/1996 | Beckwith |
| 5,544,064 A | 8/1996 | Beckwith |
| 5,550,460 A | 8/1996 | Bellin |
| 5,552,696 A | 9/1996 | Trainor |
| 5,568,398 A * | 10/1996 | Trainor ............... 700/298 |
| 5,576,625 A | 11/1996 | Sukegawa |
| 5,581,173 A | 12/1996 | Yalla |
| 5,621,439 A | 4/1997 | Okada |
| 5,642,007 A | 6/1997 | Gyugi |
| 5,646,512 A | 7/1997 | Beckwith |
| 5,680,324 A | 10/1997 | Schweitzer, III |
| 5,793,750 A | 8/1998 | Schweitzer, III |
| 5,838,525 A | 11/1998 | Ward |
| 5,844,550 A | 12/1998 | Trainor |
| 5,889,474 A | 3/1999 | LaDue |
| 5,932,997 A | 8/1999 | James |
| 5,940,026 A | 8/1999 | Gelbien |
| 5,982,595 A | 11/1999 | Pozzuoli |
| 6,005,759 A | 12/1999 | Hart |
| 6,137,277 A | 10/2000 | Rajda |
| 6,160,806 A | 12/2000 | Cantwell |
| 6,288,881 B1 | 9/2001 | Melvin |
| 6,404,655 B1 | 6/2002 | Welches |
| 6,469,629 B1 | 10/2002 | Campbell |
| 6,507,178 B2 | 1/2003 | Cocetta |
| 6,573,631 B2 | 6/2003 | Ma |
| 6,633,998 B1 | 10/2003 | Lau |
| 6,768,370 B2 | 7/2004 | Takahashi |
| 6,795,789 B2 | 9/2004 | Vandiver |
| 6,911,853 B2 | 6/2005 | Kizer |
| 6,947,264 B2 | 9/2005 | Gill |
| 7,027,896 B2 | 4/2006 | Thompson |
| 7,271,572 B2 | 9/2007 | Labuschagne |
| 7,463,467 B2 | 12/2008 | Lee |
| 7,504,806 B2 | 3/2009 | Labuschagne |
| 7,714,592 B2 * | 5/2010 | Radtke et al. ............... 324/629 |
| 2002/0006199 A1 | 1/2002 | Sako |
| 2002/0046354 A1 | 4/2002 | Ostrom |
| 2002/0080091 A1 | 6/2002 | Acharya |
| 2002/0173927 A1 | 11/2002 | Vandiver |
| 2003/0016001 A1 | 1/2003 | Borup |
| 2005/0276133 A1 | 12/2005 | Harding |
| 2005/0280965 A1 | 12/2005 | Lee |
| 2006/0095507 A1 | 5/2006 | Watson |
| 2006/0193099 A1 | 8/2006 | Schweitzer |
| 2007/0090811 A1 * | 4/2007 | Labuschagne ............... 323/217 |
| 2007/0285079 A1 * | 12/2007 | Nasle ............... 324/76.22 |

FOREIGN PATENT DOCUMENTS

| | | |
|---|---|---|
| EP | 0455314 | 11/1994 |
| EP | 0525428 | 11/1995 |
| EP | 0437861 | 6/1996 |
| EP | 0488123 | 6/1996 |
| EP | 0554553 | 7/1996 |
| EP | 0384435 | 8/1996 |
| JP | 54105750 | 8/1979 |
| JP | 54132747 | 10/1979 |
| JP | 1268423 | 10/1989 |
| JP | 1303011 | 12/1989 |
| JP | 2013220 | 1/1990 |
| JP | 2106126 | 4/1990 |
| WO | 86/00488 | 1/1986 |
| WO | 88/05543 | 7/1988 |
| WO | 89/09411 | 10/1989 |
| WO | 95/24014 | 9/1995 |
| WO | 2004/001431 A1 | 12/2003 |

OTHER PUBLICATIONS

7SD512 V3 Digitaler Stromvergleichsschults fur Leitungen, Geratehandbuch der Siemens AG 1995 order No. C53000-G1100-C105-1.

A numberical Current Comparison Protection With Digital Measured Value Transmission Over Fibre Optic Cable, Koch et al. Southern African Conference on Power System Protection, Sep. 1991.

A New Approach to Digital Current Differential Protection for Low and Medium Voltage Feeder Circuits Using a Digital Voice-Frequency Grade Communications Channel, Redfern, et al. IEEE Transactions on Power Delivery Jul. 9 , (1994), No. 3, New York, US.

Confirmation From a customer (Eskom) of Siemens AG from South Africa.

Delivery note for current comparison protection devices 7SD512 dated Feb. 1996.

Statutory Declaration by Mr. Staasmeier.

Acceptance report on 7SD512 apparatus (take-over report dated Nov. 27, 1996).

Schweitzer, III, Four New Digital Relays for Overhead Transmission Line Protection, 12th Annual Western Relay Conference, Oct. 22-24, 1985 USA.

Cooper Power Systems,2004 Voltage Regulators, CL-6 Series Control Installation, Operation, and Maintenance Instructions, S225-11-1 www.cooperpower.com.

Operating Instructions BA 225/02 Voltage Regulator TAPCON 230, www.reinhausen.com.

Translation of Siemen letter dated Jun. 14, 2004 to EPO Munich in opposition to EP 0810714.

PCT/US2007/020369 Patent Cooperation Treaty, From the International Bureau, PCT Notification Concerning Transmittal of International Preliminary Report on Patentability (Chapter 1 of Patent Cooperation Treaty), Date of Mailing: Apr. 9, 2009, Applicant: Schweitzer Engineering Laboratories, Inc.

Schweitzer Engineering Laboratories, Inc., SEL-2505 Remote I/O Module—Increase Reliability, Enhance Safety, Reduce Costs, Sep. 15, 2008, www.selinc.com.

* cited by examiner

US 8,427,131 B2

VOLTAGE REGULATION AT A REMOTE LOCATION USING MEASUREMENTS FROM A REMOTE METERING DEVICE

RELATED APPLICATION (none)

TECHNICAL FIELD

This disclosure relates to voltage regulation of an electric power delivery system using a remote metering device. More particularly, this disclosure relates to methods and apparatuses for controlling a voltage regulator to regulate voltage at a remote location using measurements from the remote location.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Electric power transmission and distribution systems (delivery systems) are designed to transmit, and distribute electrical power from generation sites to loads. The distance between generation sites or distribution substations and loads is often substantial. Although it is at the substation where much of the electric power protection, control, automation, and monitoring equipment (including voltage regulators and VRCs) are located, it is at the loads that the voltage of the electric power delivery system needs to be maintained within acceptable levels for consumption by the electric power consumer. For this reason, electric power delivery systems often include voltage regulators to regulate the voltage at the loads. Traditionally, voltage regulators are located at substations that may be distant from the load center where the voltage needs to be regulated. Further, there may be electrical power system equipment between the voltage regulator and the load that may cause the voltage of the electric power delivery system on the side of the voltage regulator to be different from the voltage on the side of the load center.

Figure 1:
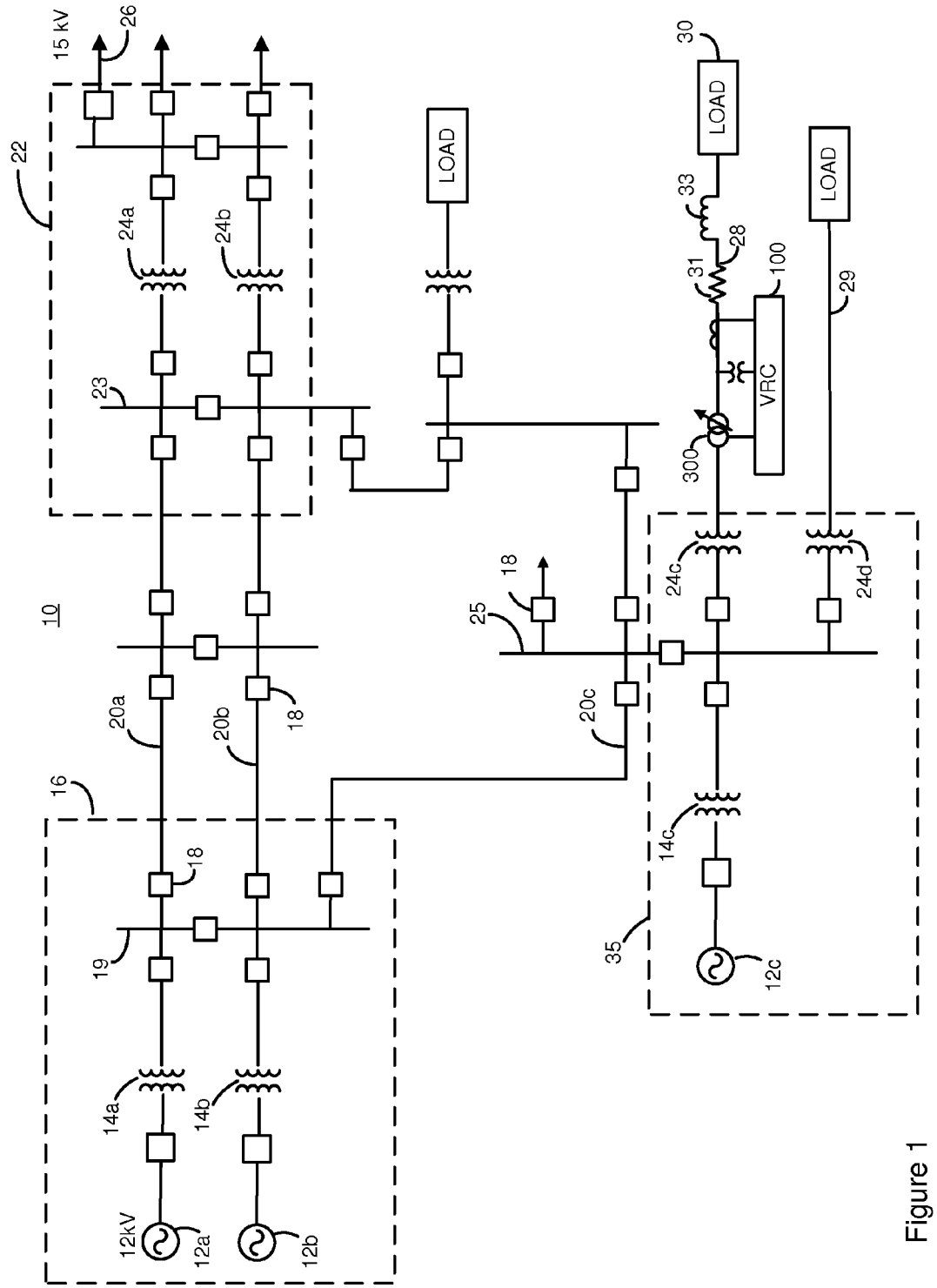
FIG. 1 is a one-line diagram of an electric power transmission and distribution system according to one embodiment.

FIG. 1 illustrates a one-line diagram of an electric power generation, transmission, and distribution system 10 (or "power system" 10) that includes a voltage regulator and a voltage regulator control. The power system 10 includes, among other things, three generators 12a, 12b and 12c, configured to generate three-phase sinusoidal waveforms such as 12 kV sinusoidal waveforms, three step-up power transformers 14a, 14b and 14c, configured to increase the generated waveforms to higher voltage sinusoidal waveforms such as 138 kV sinusoidal waveforms and a number of circuit breakers 18. The step-up power transformers 14a, 14b, 14c operate to provide the higher voltage sinusoidal waveforms to a number of long distance transmission lines such as the transmission lines 20a, 20b and 20c. In an embodiment, a first substation 16 may be defined to include the two generators 12a and 12b, the two step-up power transformers 14a and 14b and associated circuit breakers 18, all interconnected via a first bus 19. A second substation 35 may be defined to include the generator 12c, the step-up power transformer 14c and associated circuit breakers 18, all interconnected via a second bus 25. At the end of the long distance transmission lines 20a, 20b (interconnected with bus 23), a third substation 22 includes two step-down power transformers 24a and 24b configured to transform the higher voltage sinusoidal waveforms to lower voltage sinusoidal waveforms (e.g., 15 kV) suitable for distribution via one or more distribution lines 26.

As illustrated, the second substation 35 also includes two step-down power transformers 24c and 24d on respective distribution lines 28 and 29 to transform the higher voltage sinusoidal waveforms, received via the second bus 25, to lower voltage sinusoidal waveforms. A (line) voltage regulator 300 is included on the load side of the power transformer 24c to provide voltage regulation for the load center 30. For example, the voltage regulator 300 may be designed to provide 13 kV±10% for distribution via an A-phase distribution line 28 to the load center 30. Line 28 may exhibit a line resistance 31 and a line reactance 33.

VRC 100 is operatively coupled to voltage regulator 300, and executes a voltage control scheme (discussed below), to provide control to the associated voltage regulator 300. Although illustrated as a single line schematic diagram for ease of discussion, it should be noted that each of the A-, B- and C-phase distribution lines may include a single-phase voltage regulator such as the voltage regulator 300 and an associated VRC such as the VRC 100. It should also be noted that the VRC 100 may be in the form of an intelligent electronic device (IED) capable of executing the voltage control scheme (discussed below) and does not need to be limited to the functions of a traditional VRC.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Figure 2:
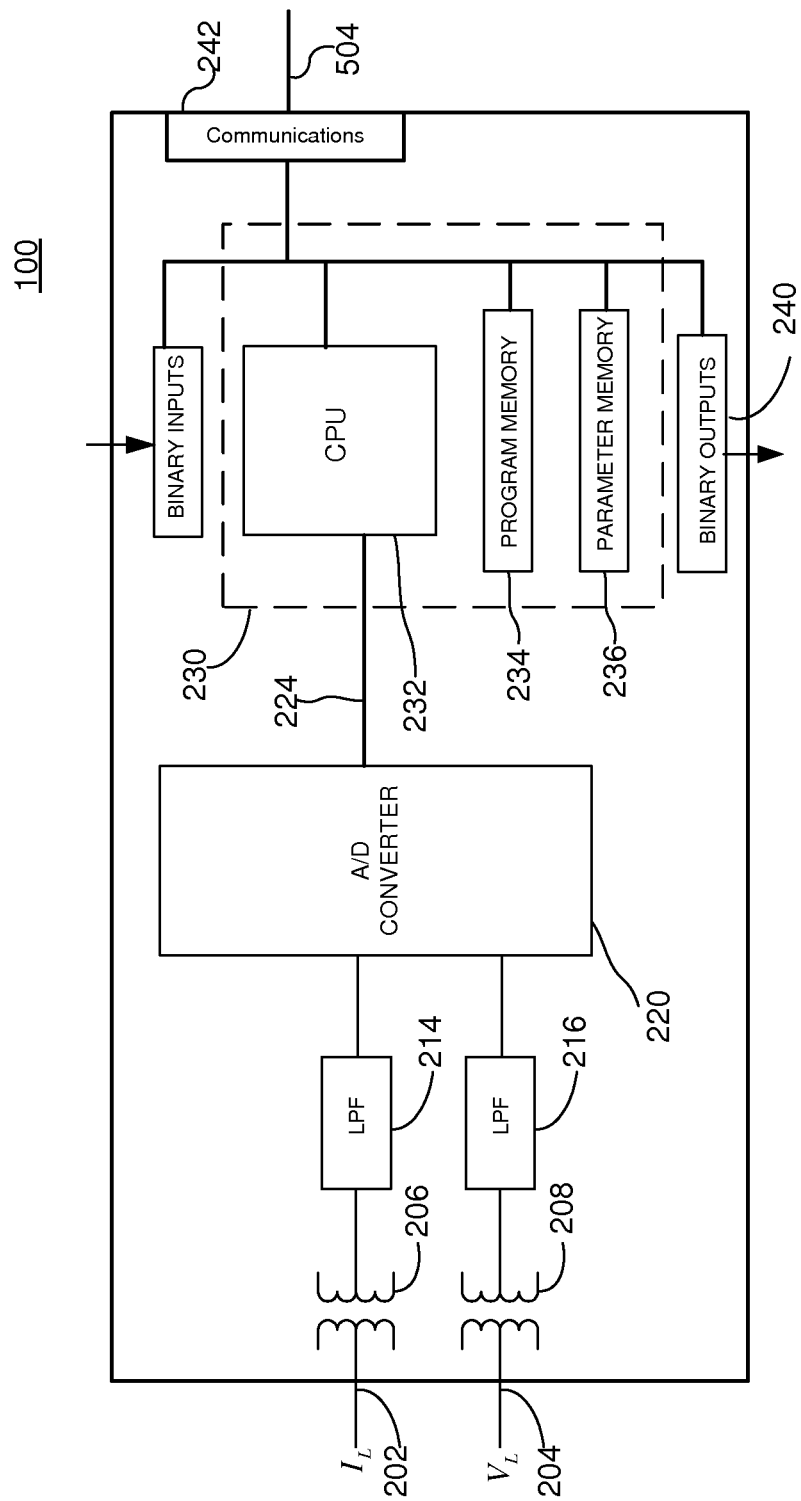
FIG. 2 is a simplified block diagram of a voltage regulator control (VRC) according to one embodiment.

FIG. 2 illustrates a simplified block diagram of a VRC 100 used to control a voltage regulator 300. The VRC 100 operates to command the voltage regulator 300 to change tap positions to regulate voltage of the electric power delivery system at the load center 30. During operation of the VRC 100, a secondary local current waveform $I_L$ 202 resulting from a current transformer (CT) (see CT 304 in FIG. 3) in communication with the distribution line 28 is transformed into a corresponding voltage waveform via a CT 206 and a resistor (not separately illustrated), and filtered via an analog low pass filter 214. A secondary local voltage waveform 204 resulting from a voltage transformer (PT) (see PT 306 in FIG. 3) in communication with the distribution line 28 is similarly processed using a CT 208 and filtered via another analog low pass filter 216. An analog-to-digital (A/D) converter 220 then multiplexes, samples and digitizes the filtered local secondary current and secondary voltage waveforms to form a corresponding digitized current and voltage signal 224.

It should be noted that secondary current and voltage waveforms from the CT and PT are transmitted to the VRC 100. The VRC may operate using the values from the secondary current and voltage waveforms or calculate actual measured currents and voltages on distribution line 28 using, for example, the ratio turns on the respective CT or PT. Although the description herein alludes to actual measured currents and voltages on the distribution line 28, it is to be understood that values of the secondary currents and voltages could instead be used.

The corresponding digitized current and voltage signal 224 is received by a microcontroller 230, where it is digitally filtered via, for example, Cosine filters to eliminate DC and unwanted frequency components. In an embodiment, the microcontroller 230 includes a CPU, or a microprocessor 232, a program memory 234 (e.g., a Flash EPROM) and a parameter memory 236 (e.g., an EEPROM). As will be appreciated by those skilled in the art, other suitable microcontroller configurations may be utilized. Further, although discussed in terms of a microcontroller, it should be noted that the embodiments presented and claimed herein may be practiced using a field programmable gate array (FPGA), application specific integrated circuit (ASIC) or the like.

The microprocessor 232, executing a computer program or voltage control logic scheme (discussed below in connection to FIG. 4), processes (each of) the digitized current and voltage signal 224 to extract phasors representative of a corresponding local voltage $V_L$ 204 and current $I_L$ 202 (calculated from secondary voltages and currents from the PT and CT), and then performs various calculations using the phasors to determine whether the electric power delivery system is operating within acceptable voltage levels. If an out-of-band (OOB) condition occurs, the microprocessor 232 issues a tap change command to the voltage regulator 300 to cause a tap change (i.e., change the effective turns ratio) to adjust the phase-to-ground voltage to the desired center-band voltage 402 (illustrated in FIG. 4), or reference voltage. Binary outputs 240 of the VRC 100 may be used to communicate tap change commands to the voltage regulator 300. The VRC 100 may include a control line 308 (see FIG. 3) in communication with the voltage regulator 300 for sending the tap change commands thereto.

The VRC may further include a communications port 242 in communication with a communications line 504 and the microcontroller 230. The communications port 242 is physically configured according to a chosen method of communication such as, for example, using electrical pulses (e.g. copper cable), light (e.g. infrared over fiber optics), radio frequency, or the like. The communications port 242 is further configured to transmit the communications to the microcontroller 230 in a format expected by the microcontroller 230.

Figure 4:
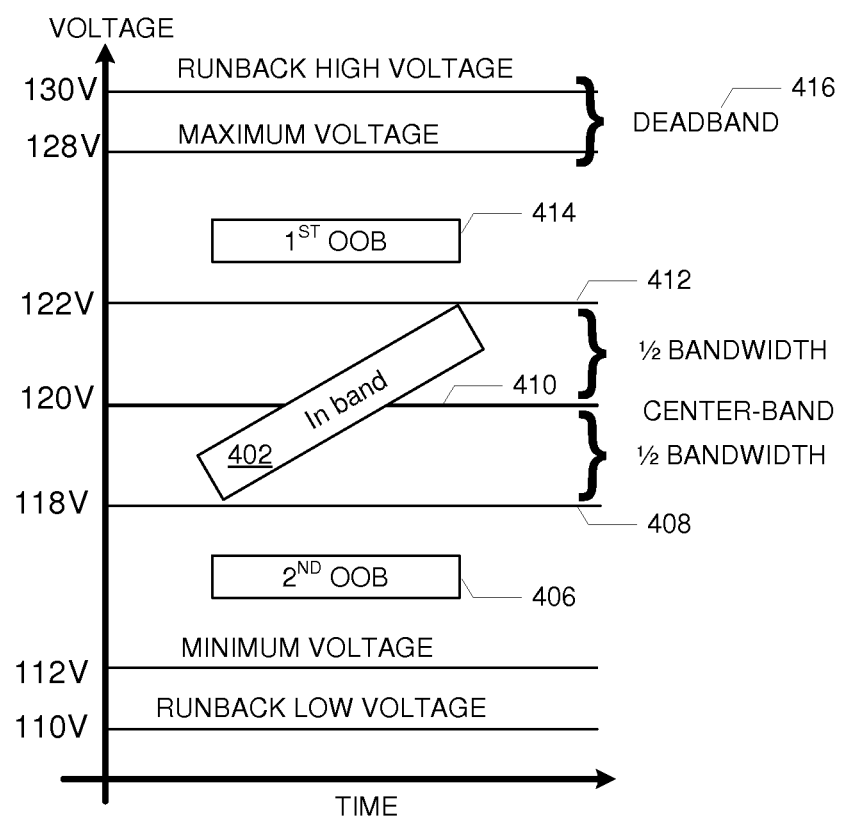
FIG. 4 is an exemplary graphic illustrating the in-band area and associated out-of-band (OOB) areas that may be used by the VRC according to one embodiment.

VRCs generally operate via a comparison of an actual local voltage $V_L$ 204 at the location on the distribution power line 28 where the voltage is measured to some internal fixed reference voltage, typically the center-band voltage 402 or maximum or minimum voltage thresholds (see FIG. 4).

Figure 3:
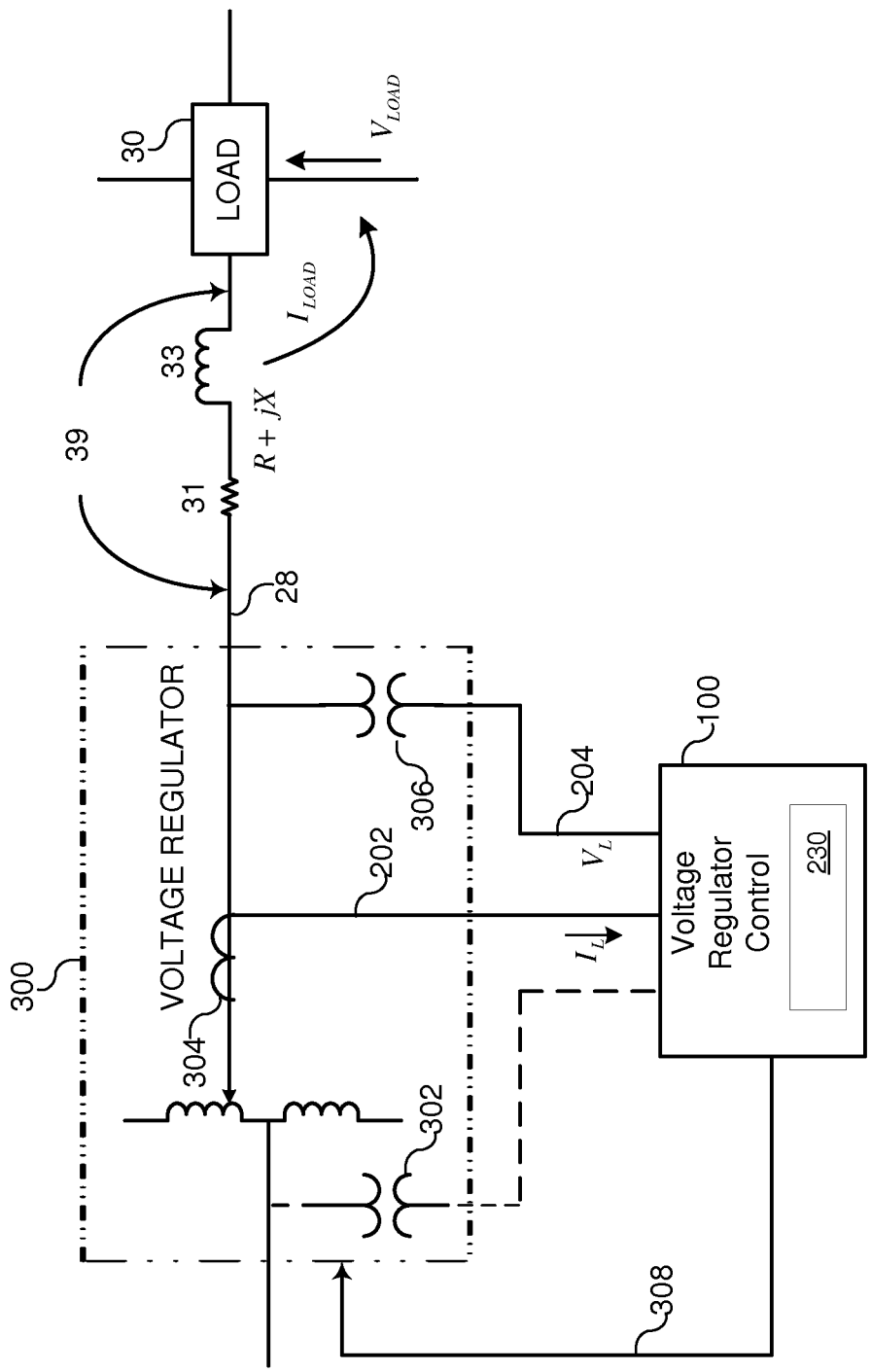
FIG. 3 is a schematic diagram of a voltage regulator with the VRC in communication therewith according to one embodiment.

FIG. 3 is a schematic diagram illustrating a configuration of the voltage regulator 300 with the VRC 100. As noted above, each phase distribution line of the A-, B- and C-phase power system may include its own voltage regulator and VRC. For ease of discussion and example, however, the voltage regulator 300 and the VRC 100 are operatively coupled to a single phase of the distribution line 28.

Because the VRC 100 is designed to utilize currents and voltages much less than those of a distribution line, transformers are provided. In the illustrated example, the VRC 100 is coupled to the distribution line 28 via one CT 304 and one PT 306. The PT 306 is used to step-down the power system voltage to a secondary voltage waveform 204 having a magnitude that can be readily monitored and measured by the VRC 100 (e.g., to step-down the distribution line voltage from 13 kV to 120 V). Similarly the CT 304 is utilized to proportionally step-down the power system line current to a secondary current 202 having a magnitude that can be readily monitored and measured by the VRC 100 (e.g., step-down the distribution line current from 200 amps to 0.2 amps). A second PT 302 may also be included for use during a reverse load condition (i.e., a generator is switched in on the load side). As shown, each of the CT 304 and the PT(s) 306, 302 are included in the voltage regulator 300; however, other arrangements of the voltage regulator 300, the VRC 100 and associated transformers are contemplated.

When received by the VRC 100, the current $I_L$ 202 and phase-to-ground voltage $V_L$ 204 are filtered, processed and utilized by a microcontroller 230 to calculate phasors having corresponding magnitudes and phase angles. The phasors are used by the microcontroller 230 to determine whether a tap change is needed to adjust the load voltage back into a center-band (e.g., adjust to 120 V).

FIG. 4 illustrates an example graphic 400 showing the in-band area 402, including the center-band voltage 410, and associated OOB areas 414, 406 that may be used by the VRC 100. Although assigned voltage values for discussion purposes, it should be noted that the in-band area 402 and the first and second OOB areas 414, 406 may include different voltage values.

As illustrated in this example, a center-band voltage 410 included within an in-band area 402 is selected to be 120 V±2V for a total in-band area width of 4 V. As a result, the first OOB area 414 begins at a first in-band/OOB edge 412 at 122V and extends upward beyond 128V, where 128V is the maximum voltage above which tap RAISE commands are suspended by the VRC 100. The second OOB area 406 begins at a second in-band/OOB edge 408 at 118V and extends downward beyond 109V, where 109V is the minimum voltage below which tap LOWER commands are suspended by the VRC 100. A deadband area 416 is established between 128V and a runback voltage of 130V in order to effect fast voltage correction because of an extreme voltage condition. When the measured voltage $V_L$ 204 is equal to or above the runback voltage, the VRC 100 issues a tap LOWER command without any time delay.

As was noted above, the VRC 100 is designed to regulate power system conditions at a remote location such as a load center by enabling tap changes at the local voltage regulator 300. Various pieces of power system equipment may be located between the voltage regulator 300 (or the location at which the VRC 100 obtains power system information) and the remote location (such as load center 30). These pieces of equipment may cause a difference between the power system conditions at the local location and the remote location. Certain equipment can cause a voltage drop 39 (FIG. 3) from the local location to the remote location.

For example, the conductor between the voltage regulator 300 and the load center 30 has a certain impedance associated therewith. This impedance causes a voltage drop between the voltage regulator 300 and the load center 30. If impedance were relatively uniform, the VRC 100 may be programmed to estimate the power system conditions such as voltage at the remote location using a line drop compensation algorithm. Such an estimation may use the locally measured voltage $V_L$ and current $I_L$ to determine the estimated remote voltage $V_{R\_est}$ by multiplying the local current $I_L$ by the line impedance estimate $Z_{line}$ and subtracting that product from the local voltage $V_L$, as illustrated in Equation 1:

$$V_{R\_est} = V_L - I_L * Z_{line} \qquad \text{Eq. 1}$$

where $Z_{line}$ is the complex line impedance estimate that is calculated by adding the real part (line resistance $R_{line}$ 31) and the complex part (j multiplied by the line reactance $X_{line}$ 33). Equation 2 illustrates the calculation of line impedance estimate $Z_{line}$:

$$Z_{line} = R_{line} + jX_{line} \qquad \text{Eq. 2}$$

where j is the imaginary unit. The line impedance estimate $Z_{line}$ may further include other factors that may contribute to a drop in voltage between the voltage regulator 300 and the load center 30 such as a factor for tapped loads, shunt capacitors, and the like.

It should be noted that VRCs can be set using voltage drop settings instead of line impedance settings. VRCs can then use the voltage drop settings to calculate a line impedance estimate for use in estimating the remote voltage according to, for example, Equation 1. In one example, a VRC is set using real and imaginary parts of voltage drop settings according to:

$$Z_{line} = R_{line} + jX_{line} = (V_{drop\_setting\_R} + jV_{drop\_setting\_X}) * I_{nom} \qquad \text{Eq. 3}$$

where $V_{drop\_setting\_R}$ is the voltage drop of the line across the real component of the line impedance, $V_{drop\_setting\_X}$ is the voltage drop of the line across the imaginary component of the line impedance, and $I_{nom}$ is the nominal current. In this example, the user setting the relay would set the VRC using the $V_{drop\_setting\_R}$ setting and the $V_{drop\_setting\_X}$ setting. The VRC internally computes the line impedance estimate $Z_{line}$ for use in calculating the remote estimated voltage $V_{R\_est}$.

Accordingly, the VRC 100 may use the remote estimated voltage $V_{R\_est}$ to enable tap changes, and thus attempts to regulate the electric power delivery system to maintain the voltage at the load center 30 in the in band area 402. Turning again to FIG. 4, the VRC 100 may be configured to compare the remote estimated voltage $V_{R\_est}$ with the thresholds 408 and 412, and cause the voltage regulator 300 to change tap positions accordingly when the remote estimated voltage $V_{R\_est}$ breaches a threshold 408 or 412 into an OOB area 406 or 414.

Certain of the variables of Equations 1 and 2 may be treated as constants in calculating the line drop compensation when setting the VRC 100 with a constant for the line impedance $Z_{line}$. For example, line impedance may be treated as a constant due to treating line resistance $R_{line}$ 31 and line reactance $X_{line}$ 33 as constants. However, line resistance $R_{line}$ 31 is a function of line length, line cross-sectional area, and line temperature. Although certain characteristics of the line such as length and cross-sectional area may not change and may be programmed into the equation at relay setting time, other variables such as temperature may change, causing the line drop compensation algorithm to be less accurate. Further, these calculations may be less accurate due to different types of conductors used in the electric power delivery system between the voltage regulator 300 and the load center 30.

Other power system equipment that may be used in an electric power delivery system that contribute to a voltage drop between the voltage regulator 300 and the load center 30 include certain tapped loads 540 (see FIG. 5), shunt capacitors, and the like. Certain of the power system equipment that may contribute to voltage drop contribute in a variable manner to the voltage drop, thus introducing error into the method of estimating a remote voltage using local measurements and a set line impedance value or set voltage drop values.

Figure 9:
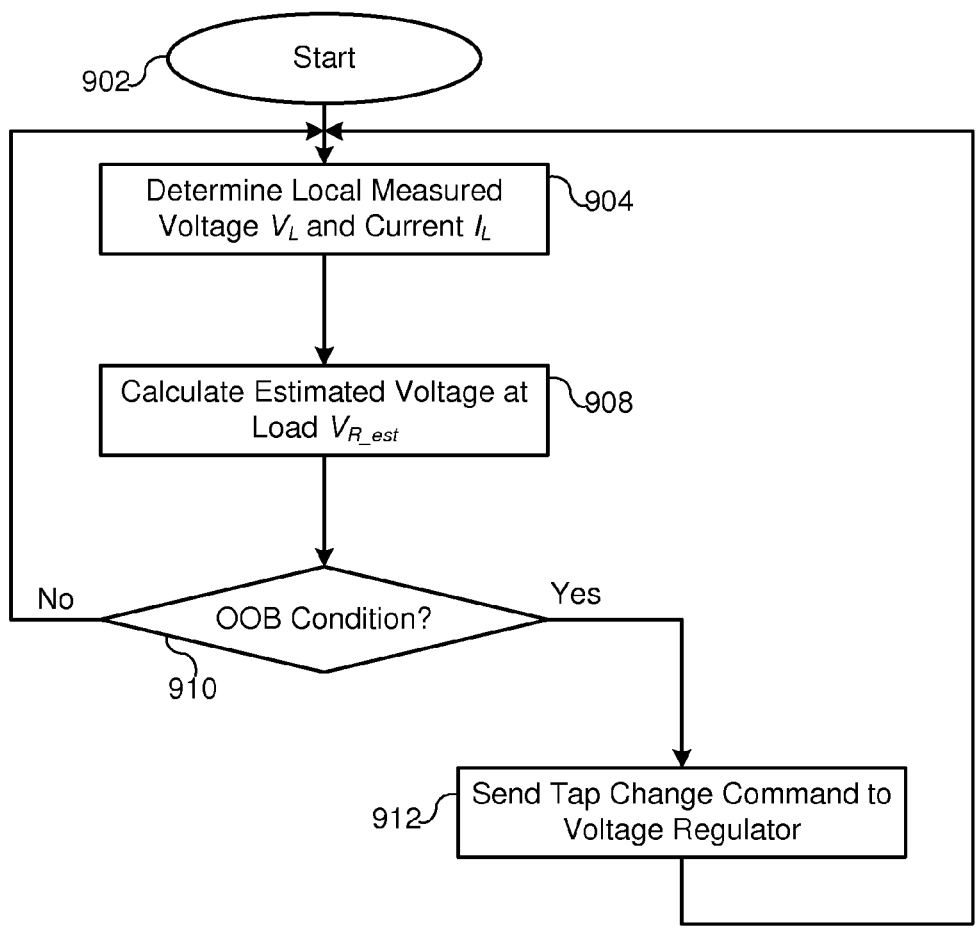
FIG. 9 is a flowchart of a method of regulating voltage at a remote location using local voltage and current measurements according to one embodiment.

One method 900 of regulating the voltage at a remote location using locally-measured voltage and current values is illustrated in the flowchart of FIG. 9. The method 900 starts 902 when measurements of local voltage $V_L$ and local current $I_L$ are made. This may occur on a periodic basis such as corresponding with a predetermined sampling frequency such as 16 or 32 times per power system cycle (960 or 1920 samples per second for a 60 Hz electric power system). The cycle may alternatively be performed upon interrupts that may be preset and dependent on passage of predetermined amounts of time, occurrence of predetermined power system conditions, or the like.

The method 900 continues to determine the local measured voltage $V_L$ and local measured current $I_L$ 904 with which the VRC 100 calculates 908 the remote estimated voltage $V_{R\_est}$ according to Equation 1. The method 900 then determines whether an OOB condition exists 910 based on a comparison of the remote estimated voltage $V_{R\_est}$ with the thresholds 408 and 412. If an OOB condition does exist, then the VRC 100 sends a tap position change command to the voltage regulator 912 to tap up or tap down the voltage as is needed. Otherwise, the method 900 returns to the start and waits for the next sample or next interrupt.

Figure 5:
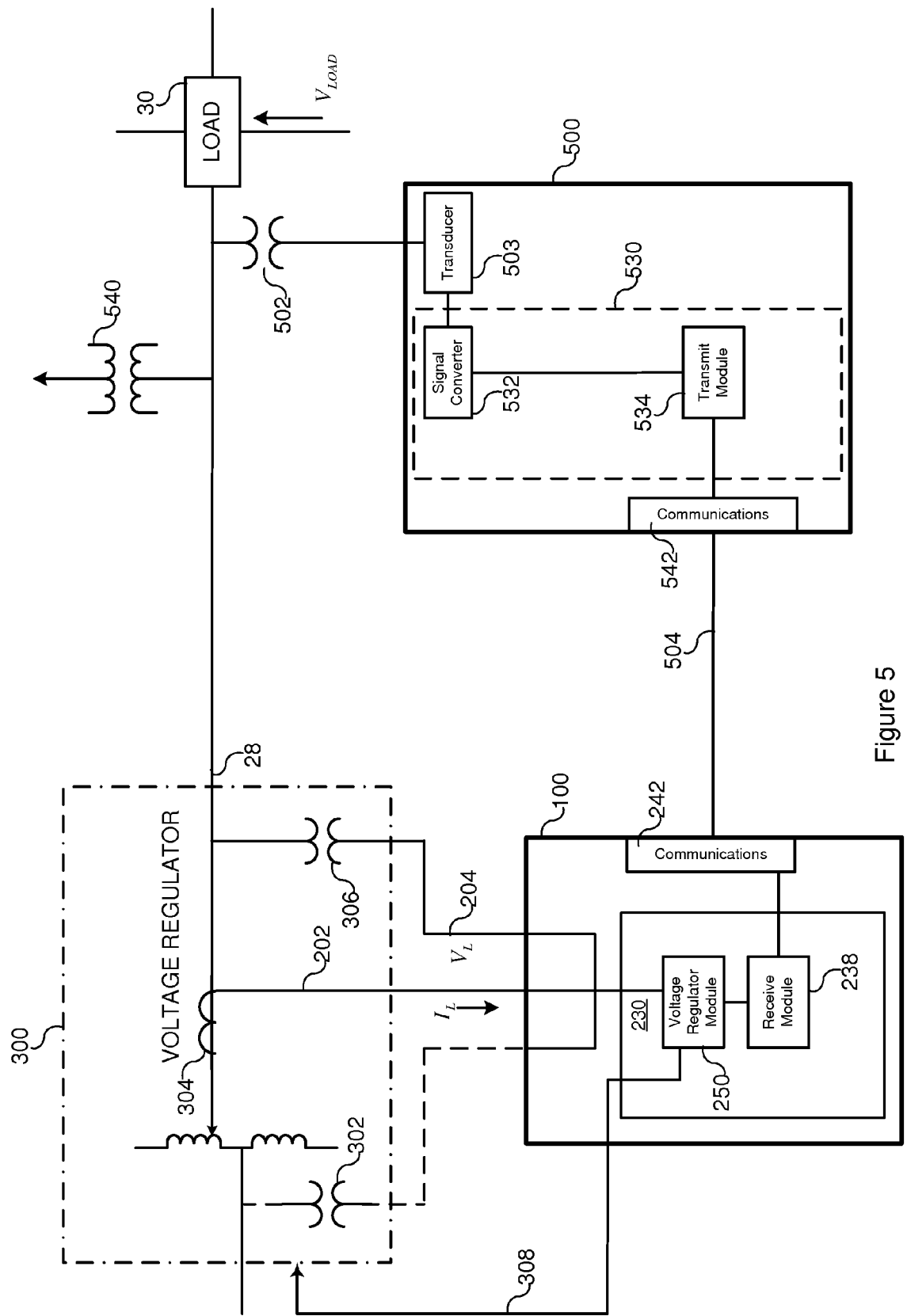
FIG. 5 is a schematic diagram of a voltage regulator with the VRC in communication therewith and a remote metering device also in communication therewith according to one embodiment.

FIG. 5 illustrates another schematic of an electric power delivery system designed to regulate voltage at a remote location (such as load center 30) using a voltage regulator 300 at a local location and power system information measured at the remote location. As with FIG. 3, the voltage regulator 300 is controlled using a VRC 100. The VRC 100 may receive local power system information via various PTs 302, 306 and CT 304. Also illustrated along the line 28 is a tapped load 540 that may contribute in various degrees to the line voltage drop between the voltage regulator 300 and the load center 30. Typical line drop compensation algorithms do not account for variable voltage drop attributable to equipment other than the conductor.

A metering device 500 is also shown in communication with the line 28 at a remote location near the load center 30. The metering device 500 may be any device capable of metering electrical conditions on the power line 28 and communicating such conditions to other devices. The metering device 500 may be in the form of an intelligent electronic device (IED) such as a protective relay, meter, capacitor bank control, transformer monitor, or the like, configured to monitor the power system conditions at the remote location. The metering device 500 may be in communication with the line 28 using various CTs and PTs, though illustrated is a single PT 502. As is illustrated, the metering device receives a secondary voltage waveform from the PT 502, and includes various circuits and modules configured to process the secondary voltage waveform and communicate the power system information resulting therefrom to the VRC 100. The power system information may include measurements of the power system voltage. The power system information may further include voltage phasors associated with the remote location.

The metering device 500 includes a transducer 503 for converting the secondary voltage waveform into power system data that may be used by a microcontroller 530 of the metering device 500. The transducer 503 may include various circuits such as transformers, filters (such as a low-pass filter), and A/D converters, as illustrated in FIG. 2 and described in conjunction with the VRC 100. If the transducer 503 does not include an A/D converter, or if the signal needs further processing, these tasks can be done within a signal converter 532 operating on the microcontroller 530 to convert analog signals to digital format. The digital format may include power system information usable by the VRC 100 for regulating voltage.

In one example, the signal converter 532 simply converts the voltage waveform into a digital format, which is then converted into a communications format by a transmit module 534 and communicated to the VRC 100. In another example, the microcontroller 530 may further process the digital signal waveform into other usable data such as voltage phasors. The voltage phasors may similarly be converted into a communications format and communicated to the VRC 100. The metering device 500 further may include a communications port 542 in communication with the communications line 504 and the microcontroller 530. The communications port 542 may be similar to the communications port 242 of the VRC 100 in that it is physically configured according to the chosen communications medium. The communications port 542 is further configured to transmit messages from the microcontroller 530 along a communications line 504.

The VRC 100 and the metering device 500 may be in communication via a communications medium. In one example, the VRC 100 and metering device 500 are in communication via the communications line 504 that may operate using, for example, electrical pulses (e.g. a copper cable) or light (e.g. infrared over fiber optics). The communications medium may use radio frequency communications or the like. The communications line 504 and associated communications port 542 may be configured with serial lines and ports, Ethernet lines and ports, fiber-optic lines and ports, or the like. In one example, the communications medium may be the monitored line 28 using a power line carrier communication.

The VRC 100 may include a communications port 242 for connection to the communications line 504 and transmitting the received signals to a receive module 238 within the microcontroller 230 of the VRC 100. The communications port 242 may include the necessary circuitry to convert the received communications into a format usable by the receive module such as a Universal Asynchronous Receiver/Transmitter (UART), serial port, Ethernet port, fiber-optic port, universal serial bus (USB), or the like. The metering device 500 may be configured to communicate raw data (e.g. voltage magnitude measurements), phasor measurements, or the like. The receive module 238 may then convert the received communications as needed (if they are not already communicated as phasors) into phasors usable by the microcontroller algorithms to regulate the voltage at the remote location using the measurements obtained therefrom. In one example, raw voltage measurements are transmitted from the metering device 500 to the VRC 100, and are translated into voltage phasors by the receive module 238. In another example, the metering device 500 transmits voltage phasors to the VRC 100, in which case, the phasors could be communicated from the receive module 238 to the voltage regulation module 250.

The VRC 100 also includes a voltage regulation module 250 operating on the microcontroller 230 and configured to determine whether the remote load center 30 is operating within an in-band area or an OOB area. The voltage regulation module 250 is configured to create and send tap position change commands to the voltage regulator 300 in the event that the power system conditions are in an OOB area. As is illustrated, the voltage regulation module 250 receives remote voltage measurements $V_R$ from the metering device 500 via the receive module 238. The voltage regulation module 250 may further receive local voltages and currents $V_L$ and $I_L$ from the local PTs 302, 306 and the CT 304.

In one example, the voltage regulation module 250 uses the received remote voltage measurements $V_R$ instead of the remote estimated voltage $V_{R\_est}$ to regulate the remote voltage. In this example, the voltage regulation module 250 compares the received remote voltage measurements $V_R$ against the thresholds described in conjunction with FIG. 4 to determine if the load center 30 is operating within an in-band area or an OOB area. The voltage regulation module 250 is then configured to create and send tap position change commands to the voltage regulator in the event that the power system conditions at the load center 30 are in an OOB area. Accordingly, the VRC 100 is configured to regulate the voltage at a remote location (such as a load center or load center 30) using the voltage measurements at the remote location.

Figure 6:
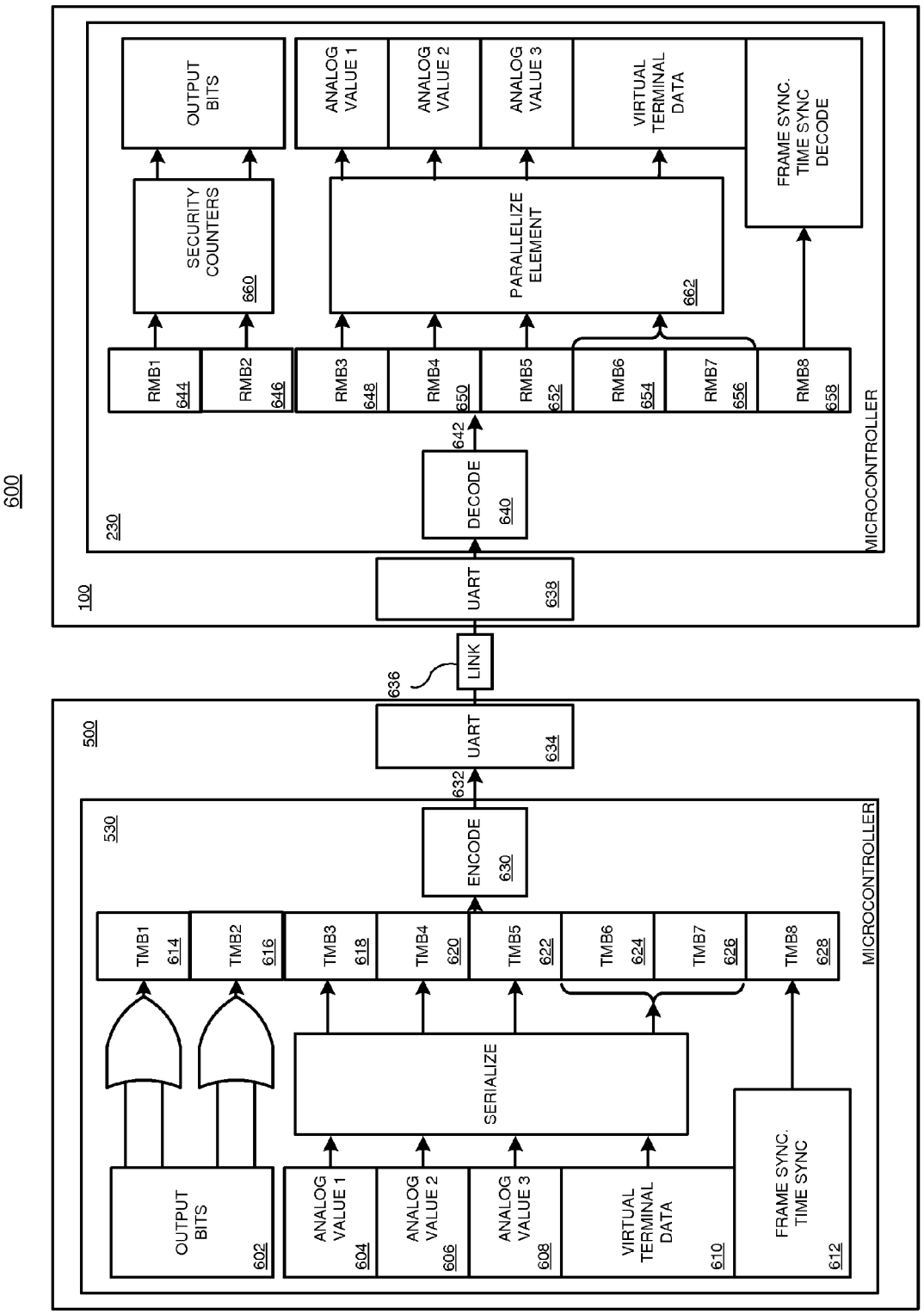
FIG. 6 is a block diagram of a communication system for use between intelligent electronic devices (IEDs) such as between the VRC and the remote metering device according to one embodiment.

FIG. 6 illustrates a block diagram 600 of one particular scheme of communicating the measured remote voltages $V_R$ from the metering device 500 to the VRC 100. This scheme may use a secure communications protocol such as that described in U.S. Pat. No. 5,793,750, hereby incorporated by a reference, and which discloses a serial communication system using successive data stream messages between two microprocessor-based devices. Each of the VRC 100 and the metering device 500 may have both transmit and receive modules for directly transmitting indication status bits indicative of the result of selected protective functions of one device, from that one device to the other, and vice versa.

The illustrated scheme supports a communication arrangement or protocol involving eight data channels for exchange of output status indication bits between the metering device 500 and the VRC 100 both quickly and securely. The channel data bits TMB1-TMB8 identify eight transmit bits, on eight data channels.

Those bits, when received by the VRC 100, are identified as received channel data bits RMB1-RMB8, wherein RMB1-RMB8 are the "mirror" or replica of the transmit channel data bits. The eight data channels may accommodate at least eight output status indication bits. As indicated above, however, in many two-IED arrangements, only two or perhaps three channels are necessary to communicate the output status indication bits. The otherwise vacant channel space may now be used by selected additional data and an associated synchronization channel to synchronize the additional data.

The additional data may be digitized analog quantities, such as power system data, or may be "virtual terminal" data. For example, in providing for additional digitized analog data in metering applications, metering quantities such as watts, VARs, amperes, etc. may be communicated. In a similar example, in providing for a virtual terminal arrangement, a human user or another application utilizes the direct communication link to communicate with the other device. For example, the human user could utilize the direct communication link to control or query the device. An application such as, for example, an integration protocol like as DNP3, could also utilize the communication link in the virtual terminal arrangement.

For ease of discussion, the metering device 500 includes a microcontroller 530 operatively coupled to a receive and transmit interface; in this example, a universal asynchronous receiver/transmit (UART) 634. The (transmitting) UART 634 is configured to convert bytes of channel data bits (corresponding to the channel data) resulting from metering device operation into a single serial message stream for outbound transmission via the communication link 504 (see FIG. 5) to the VRC 100. The UART 634 may further be configured to convert an inbound serial message stream (if any) into bytes of channel data suitable for use by the metering device 500.

Similarly, the VRC 100 includes a second microcontroller 230 operatively coupled to another UART 638, operational and configured as described above. Although not separately illustrated, the metering device 500 and the VRC 100 may include transmit and receive capability to enable bi-directional communication. Although illustrated as a UART 634 operatively coupled to the first microcontroller 530, and a UART 638 operatively coupled to the second microcontroller 230, one of any suitable transmit and receive interface means may be utilized to convert bytes of channel data bits into a serial message stream for transmission via the communication line 504.

The communication link 504 may be any type of suitable link adapted to carry analog or digitized analog data such as, for example, a fiber-optic cable, a copper cable, radio frequency, or the like. As illustrated, in addition to output status indication bits, each of the transmit and receive modules is capable of transmitting/receiving other types of channel data in the form of serial messages. For example, the channel data may include digitized analog values, derived from analog quantities that require more than a single bit such as power system information.

In one example, a system may be implemented in voltage regulation applications, whereupon this information would include electric power system information obtained by the metering device 500. In this particular example, typical metering information may include selected metering quantities such as watts, VARs, volt-amperes, frequency, harmonics, etc. The channel data may also include breaker failure system security enhancement information, reclose enable information, instrument transformer checking and multi-terminal fault location information, to name a few.

Referring to the microcontroller 530, an eight data channel arrangement is configured such that two data channels, a data channel 614 and a data channel 616, correspond to the conventional output status indication bits 602 transmitted as channel data bit 1 (TMB1) and TMB2, respectively, from the metering device 500 to the VRC 100. Three data channels, a data channel 618, a data channel 620 and a data channel 622, are dedicated to digitized analog values 604, 606 and 608 transmitted as channel data bits TMB3, TMB4 and TMB5, respectively.

Each of the digitized analog values 604, 606, 608 may be formed by, for example, converting a 32-bit floating point number representing an analog quantity (e.g., system impedances, currents, voltages)) into an 18-bit floating point number. The 18-bit floating point number is then serialized such that one bit from each of the digitized analog values 604, 606, 608 is included as channel data bits TMB3, TMB4 and TMB5, respectively, in sequential transmitted messages until all of the bits associated with the digitized analog values 604, 606, 608 are transmitted. For example, if each of the digitized analog values 604, 606, 608 is expressed in 18 bits, eighteen sequential serial messages are transmitted where the first serial message includes the first bit of the digitized analog value 604 transmitted as channel data bit TMB3, the first bit of the digitized analog value 606 transmitted as channel data bit TMB4, and the first bit of the digitized analog value 608 transmitted as channel data bit TMB5. Similarly, the second serial message includes the second bit of the digitized analog value 604 transmitted as channel data bit TMB3, the second bit of the digitized analog value 606 transmitted as channel data bit TMB4, and the second bit of the digitized analog value 608 transmitted as channel data bit TMB5, and so on.

It should be noted that while compromising some precision, the conversion scheme that converts a 32-bit floating point number (representing the analog quantity) into a corresponding 18-bit floating point number, enables quicker transmission to the VRC 100. It should also be noted that other conversion schemes may be utilized depending on the analog quantity measured, the precision desired, and the speed of transmission desired.

Two additional data channels, a data channel 624 and a data channel 626 may facilitate virtual terminal data 610 transmitted as channel data bits TMB6 and TMB7, respectively.

The eighth data channel 628 is dedicated to synchronization information 612 transmitted as channel data bit TMB8 from the metering device 500 to the VRC 100. The synchronization information 612 enables synchronization of the data channels associated with the analog values 604, 606, 608 and the virtual terminal data 610. Thus, when any of the data channels 614-626 are used for anything other than the output status indication bits, a dedicated synchronous channel is allocated for synchronization information 612 transmitted as channel data bit TMB8.

Although illustrated utilizing an eight data channel arrangement, it should be understood that a different number or arrangement and/or assignment of data channels may be used. Accordingly, the two data channels of output status indication bits in combination with the three data channels of analog values and the two data channels of virtual terminal data illustrated in FIG. 6 is arbitrary. The output status indication bits could occupy more or less or no data channels, the analog values could occupy more or less or no data channels, and the virtual terminal data could occupy more or less or no data channels. In addition, one analog value may occupy more than one data channel for speedier transmission. Similarly, virtual terminal data may occupy more than one data channel for speedier transmission.

Prior to transmission, each of the eight channel data bits TMB1-TMB8 are encoded by an encoder 630 to form an encoded message 632 using one of any number of suitable techniques. The encoded message 632 may therefore have one of any number of suitable formats, depending on the encoding scheme selected. For example, in one encoding scheme, the encoded message 632 may include 36 or 40 bits, divided into four 9-bit (for 36 bit length) or 10-bit (for 40 bit length) characters plus a number of idle bits. The number of idle bits may vary depending upon the selected transmission speed.

Continuing with the example, the bits may be assembled such that the first 9-10 bit character includes a single start bit followed by the six channel data bits TMB1-TMB6, followed by an odd parity bit and one or two stop bits, as selected by the user. The second character may include a second single start bit, followed by the six channel data bits TMB5, TMB6, TMB7, TMB8, TMB1 and TMB2, followed by an odd parity bit and one or two stop bits. The third character may include a start bit followed by the six channel data bits TMB7, TMB8, TMB1, TMB2, TMB3 and TMB4, followed by an odd parity bit and one or two stop bits. The fourth and final character in the message may include a single start bit followed by the six channel data bits TMB3-TMB8, followed by an odd parity bit and one or two stop bits. The remaining bits, if any, are a variable number of idle bits, depending upon transmission speed of the data.

Using such an encoding scheme, each of the channel data bits TMB1-TMB8 are repeated three times in the four character portions of one encoded message 632 with single stop and parity bits and one or two stop bits inserted between each character portion of the encoded message 632. This encoding scheme allows the VRC 100, to check for errors that may have occurred during transmission.

In addition to assembling the bits into messages, the VRC 100 and/or metering device 500 may be adapted to further encode and decode using an identifier pattern selected during system configuration. For example, if preprogrammed to include one particular identifier pattern, the transmit encoder 630 logically inverts one of the four characters in each of the messages as a means of encoding the identifier pattern into the message. Although described as assembling messages where one character is logically inverted, it should be understood that other suitable formats and encoding schemes may be utilized by the encoder 630 to generate the encoded message 632.

The encoded message 632 is then applied to the UART 634, adapted to satisfy several operating parameters for the system. In general, the UART 634 converts the encoded message 632 into a serial message 636 for transmission as part of a serial message stream via the communication link 504. Accordingly, the receiving UART 638 is also capable of checking the received serial message 636 for proper framing (the presence of one stop bit per byte) and proper parity, and detecting overrun errors.

The UART 634 may be programmed for various baud rates. For example, it might be programmed for baud rates ranging from about 300 through about 115,000. The UART 634 is additionally adapted to synchronize both transmit and receive serial messages using transmit and receive clocks externally supplied. As will be appreciated by one skilled in the art, the method of bit synchronization, using start and stop bits or using synchronizing clocks, is one of any number of suitable methods for synchronization. For example, a clock may be used in such an arrangement.

Subsequent to being prepared for transmission by the UART 634, the serial message 636 is transmitted over the communication link 504. In one example, when the metering device 500 samples and performs its related functions, each serial message 636 is sent at a 1 millisecond interval, reflecting the sampling rate of the metering device 500. The sampling and transmission rates may be varied depending on the desired operation of the transmitting intelligent electronic device.

The receiving UART 638 provides the counterpart functions of the transmitting UART 634. When the serial message 636 is received, the UART 638 performs several data checks on each character of the serial message 636. It also checks each character of the serial messages 636 for proper framing, parity and overrun errors.

From UART 638, the characters of the serial message 636 are passed to a decoder 640. In general, the decoder 640 reassembles groups of four characters in order to reconstruct the four-character message. Next, the decoder 640 checks each message for errors, and also examines the results of the UART checks described above. If any of the checks fail, the decoder 640 discards the message and de-asserts a DOK (data OK) flag for that message in a register.

As a result of operation of the decoder 640, a DOK flag and the channel data bits RMB1-RMB8 are provided. The received channel data bits RMB1-RMB8 are the mirror or replica of transmitted channel data bits TMB1-TMB8. The data OK (DOK) flag provides an indication of whether errors were detected in the received message.

The VRC 100 includes an eight data channel arrangement where two data channels are dedicated to the output status indication bits, three data channels are dedicated to three digitized analog values, two data channels are dedicated to virtual terminal data and one data channel is dedicated to synchronization information. Accordingly, the output status indication bits 602 are received as channel data bits RMB1 and RMB2 via data channels 644 and 646, respectively, and are applied to one or more security counters 660. The security counters 660 operate to ensure that the state of the received channel data bits RMB1 and RMB2 remain constant for a pre-selected number of received serial messages 636 before the output status indication bits are utilized by downstream processes. Ensuring that the state of the output status indication bits remain constant increases the reliability and security associated with the output status indication bits 602.

Because the two channel data bits RMB1 and RMB2 are transmitted bit by bit, no synchronization of those bits is required. In the illustrated example, the digitized analog values 604, 606 and 608 are received as channel data bits RMB3, RMB4, and RMB5 via a data channel 648, a channel 650 and a channel 652, respectively. Each of the three digitized analog values 604, 606, and 608 are received serially one bit per message per data channel, and are then parallelized in a parallelize element 662. The parallelize element 662 re-assembles each of the three digitized analog values from received successive decoded messages 642. As noted above, in the illustrated example, each of the digitized analog values 604, 606, and 608 includes eighteen bits. In an embodiment, sixteen bits are used for information while the remaining two bits are unused. Therefore, for every 18 messages 642, a complete original analog value is received on each corresponding data channel.

Similarly, the virtual terminal data 610 is received as channel data bits RMB6 and RMB7 via data channels 654 and 656, respectively. Like the analog values 604, 606, and 608, the virtual terminal data 610 is received serially one bit per message per data channel, and is also parallelized in the parallelize element 662. In the illustrated embodiment, the virtual terminal data 610 includes eighteen bits. Sixteen bits of the eighteen bits are utilized for virtual terminal data, where the sixteen bits are divided into two eight-bit bytes. The two remaining bits are used to indicate which of the two eight-bit byte fields actually contain virtual terminal data, and which, if any, are idle, (e.g., waiting for user input). Thus, for every 18 decoded messages 642, two virtual terminal bytes are received on each corresponding data channel 654, 656. After parallelization via the parallelize element 662, the analog values and the virtual terminal data are provided to the VRC 100.

Again, the particular arrangement of the eight data channel bits TMB1-TMB8 is established in accordance with the user's communication requirements. Different numbers of output status indication bits, analog values and virtual terminal data may be utilized to form seven bits of the eight channel data bits TMB1-TMB8.

A data channel 658, or synchronization channel, is dedicated to the remaining channel data bit, RMB8. The channel data bits RMB8 of the synchronization channel enable the receiving decoder 640 and parallelize element 662 to find the start and stop boundaries serial messages that include the digitized analog values and virtual terminal data. The synchronization channel may be necessary when any of the other channel data bits include the digitized analog values or the virtual terminal data. If all of the channel data bits are used for output status indication bits only, no synchronization is necessary and the data channel 658 may be used for output status indication bits.

In order to determine that a complete (four character) bit message has been received, the VRC 100 identifies the first byte of each of the bit messages via message synchronization. In an embodiment, message synchronization is maintained by counting modulo 4 from the first received byte after byte synchronization is achieved. Accordingly, each time the counter rolls over, the first byte is received.

The metering device 500 may further include a receive module, whereas the VRC 100 may further include a transmit module in order to provide for bi-directional communication therebetween.

Figure 7:
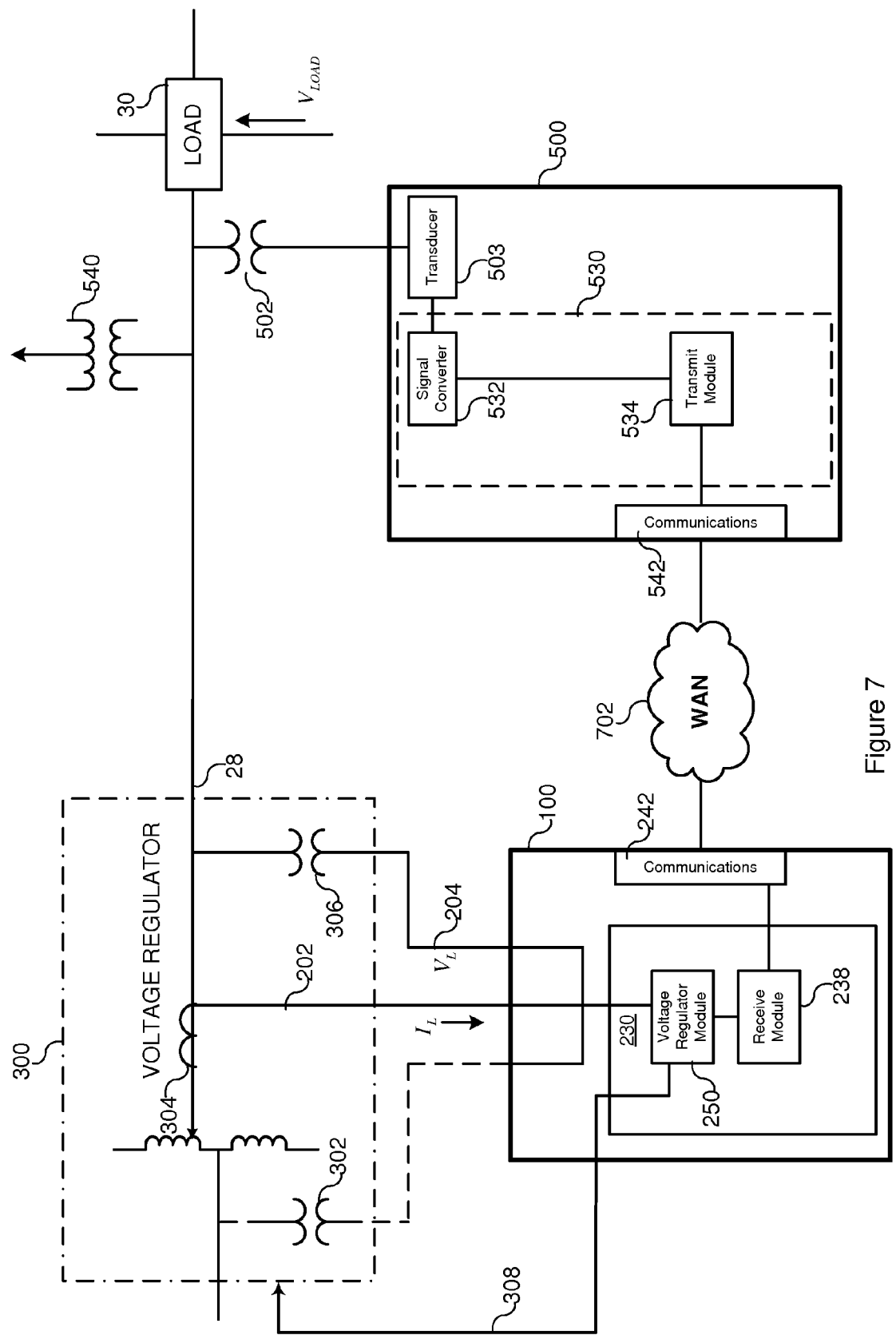
FIG. 7 is a schematic diagram of a voltage regulator with the VRC in communication therewith and a remote metering device also in communication therewith via a communications network according to one embodiment.

The metering device 500 and the VRC 100 may use one or more of various channels for communication. As discussed above and in conjunction with FIG. 5, the metering device 500 and the VRC 100 may include a direct communications link such as a fiber-optic cable, copper cable, a radio frequency channel, or the like. FIG. 7 illustrates another possible communications link between the metering device 500 and the VRC 100. The communications link illustrated in FIG. 7 includes a wide-area network (WAN) 702. It should be noted that the WAN could be substituted with a local-area network (LAN) as appropriate. In such an arrangement, the metering device 500 and the VRC 100 may use a communications protocol designed to facilitate IED-to-IED communication over a network. Accordingly, the metering device 500 and the VRC 100 of FIG. 5 are illustrated as in communication with a WAN 702. The metering device 500 and the VRC 100 may be configured to communicate according to one of several available protocols such as, for example, IEC 61850, Modbus, DNP, and the like.

In the arrangement illustrated in FIG. 7, the transmit module 534 may include and operate computer instructions for arranging the information to be communicated to the VRC 100 into packets, frames, or other segments according to the predetermined communications protocol. For example, if the chosen communications protocol is a Distributed Network Protocol (such as DNP3), the transmit module 534 may be configured to organize the data to be transmitted into DNP3 frames consisting of the header (sync bits, length, link control, destination address, source address, and cyclic redundancy check (CRC)) and the data. It should be noted that protocols such as DNP3 may be used on either a network as is illustrated in FIG. 7, or in a point-to-point arrangement such as illustrated in FIG. 5. Further, the receive module 238 may be configured to receive and decode the packets or frames and see that the data is made available to the voltage regulation module 250 as needed.

Figure 8:
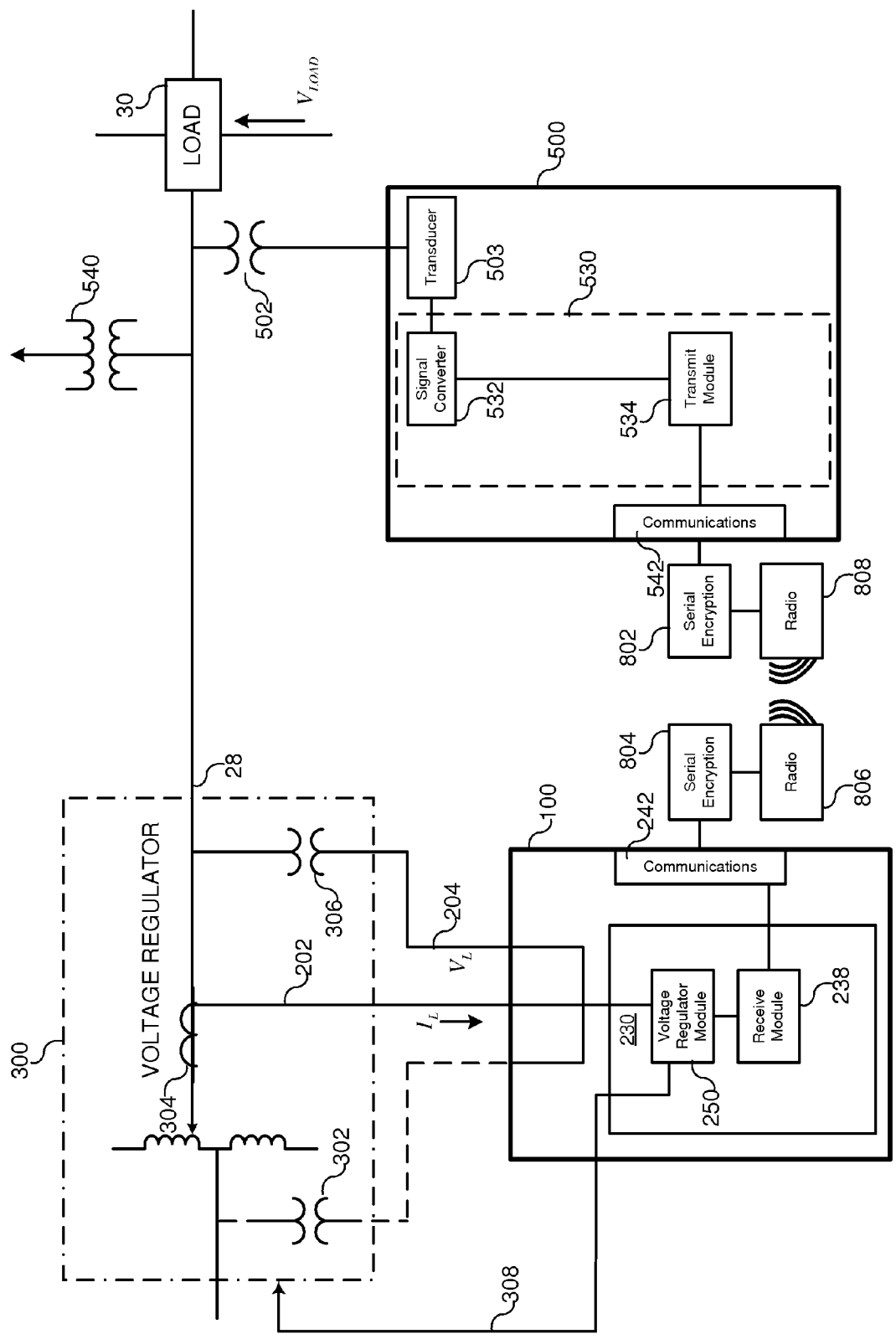
FIG. 8 is a schematic diagram of a voltage regulator with the VRC in communication therewith and a remote metering device also in communication therewith via a radio communications link according to one embodiment.

Further, as illustrated in FIG. 8, the system may include a radio communications link. That is, the WAN 702 of FIG. 7 may include a wireless network (not separately illustrated), or the radio communications link may be point-to-point. To increase the security of a wireless network, the system may include serial encryption devices 802, 804 in communication with the communications port 542 of the metering device 500 and the communications port 242 of the VRC 100. The serial encryption devices 802, 804 may encrypt communications between the metering device 500 and the VRC 100. The serial encryption devices 802, 804 may further be in communication with radios 806, 808 for converting the encrypted communication into radio communications between the metering device 500 and the VRC 100. The radio communications may be directly communicated between the metering device 500 and the VRC 100, repeated by repeaters, or communicated via an intervening WAN.

In another example, the metering device 500 may send the communications to the VRC 100 over the power line 28 using a power line carrier communication (PLCC). The communications may be sent at a frequency that is orders of magnitude higher than the fundamental operating frequency of the electric power delivery system on the power line 28 from the metering device 500 to the VRC 100. The metering device 500 may be in communication (via the communications port) with a power line interface unit (not shown) used to transmit the communications onto the power line 28. The VRC 100 may also be in communication (via the communications port) with a power line interface unit used to receive the communications from the power line 28.

Figure 10:
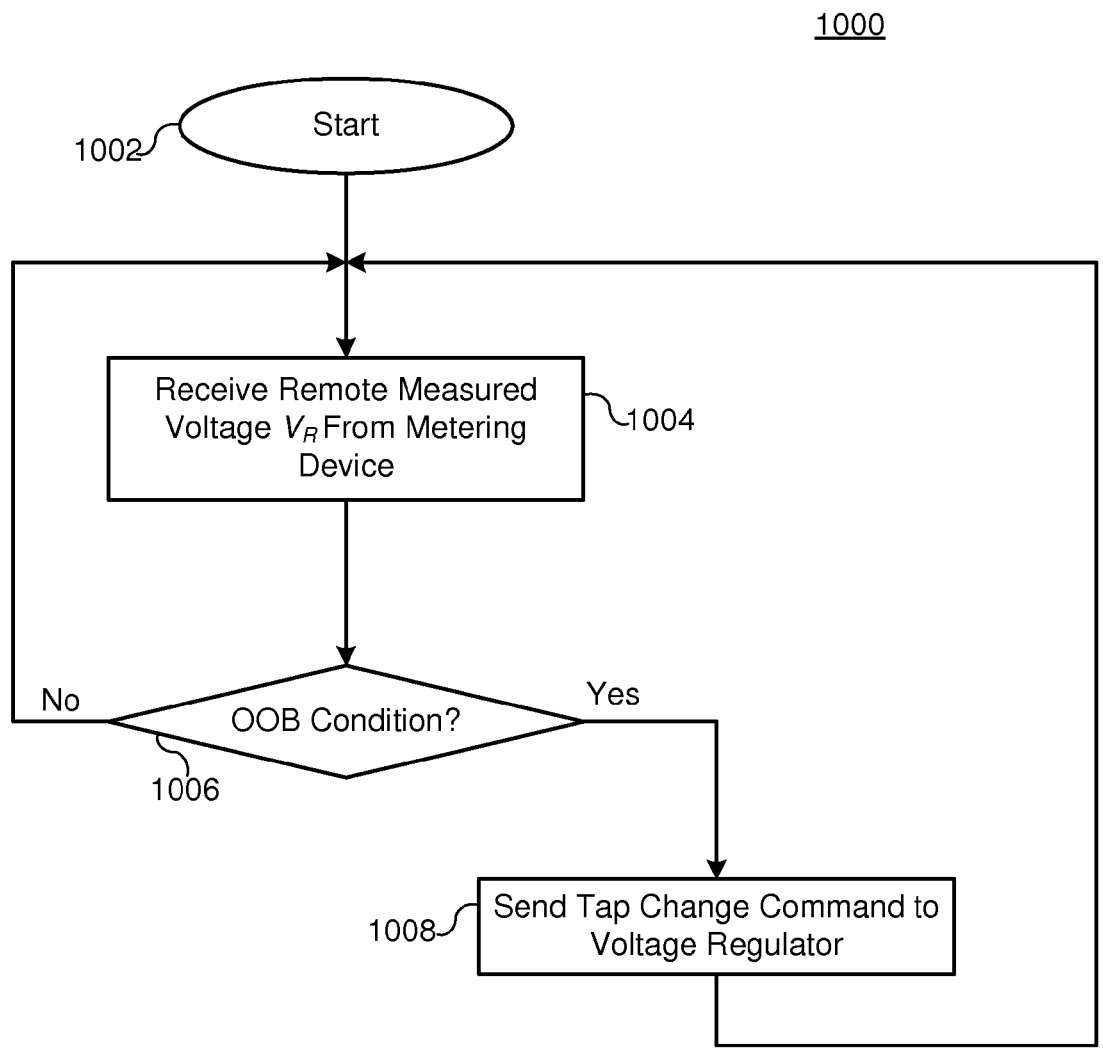
FIG. 10 is a flowchart of a method of regulating voltage at a remote location using remote voltage measurements according to one embodiment; and, FIG. 11 is a flowchart of a method of regulating voltage at a remote location using remote voltage measurements when they are available according to one embodiment.

A method 1000 for regulating a remote voltage using remote measured power system information is illustrated in the flow chart of FIG. 10. The method 1000 starts 1002 when remote power system samples such as remote voltage measurements $V_R$ are received 1004 by the VRC 100 from the remote metering device 500. The samples may be received as they are sent from the remote metering device 500. The remote metering device 500 may be configured to calculate samples on a predetermined schedule such as a multiple of power system frequency (e.g. 960 or 1920 samples-per-second, corresponding with a sampling rate of 16 or 32 samples-per-cycle on a 60 Hz electric power system). Alternatively, the method 1000 may cycle on interrupts using the most recently available remote electric power system information. The method 1000 then determines whether an OOB condition exists 1006 using the received remote voltage $V_R$ sample. If an OOB condition does exist, then the VRC 100 is configured to send a tap-change command to the voltage regulator 1008 to enable a tap change position, thus regulating the remote voltage, and then returns to the start to wait for the next sample. Otherwise, the method 1000 simply returns to the start and waits for the next sample.

Although the VRC 100 and voltage regulator 300 of several of the figures illustrate the VRC 100 receiving local power system information from CTs and/or PTs in communication with the electric power delivery system at the voltage regulator 300, it is contemplated that the VRC 100 being configured to regulate voltage at a remote location using remote power system data would not necessarily need to receive the local electric power system information from the local CTs and/or PTs for the purpose of regulating the voltage at the remote location.

It should be noted, however, that the VRC 100 may require local power system data for other control, protection, automation, or monitoring operations. For example, the VRC 100 may be configured to regulate voltage at both the load center (remote) and locations nearer to the voltage regulator 300. Such schemes may be configured to ensure that the voltage on the power line 28 nearer to the voltage regulator than to the load center 30 does not exceed the maximum voltage (entering the deadband 416). It has been observed that the slope of voltage drop over a distance in a power delivery system is not constant and may change in relation to the tapped loads, the amount of current being transmitted, and the like. Accordingly, causing a tap change to increase the voltage at the load center out of the second OOB 406 may cause the voltage nearer to the voltage regulator 300 to increase into the deadband 416. The VRC 100 may therefore be configured to regulate not only the voltage at the load center 30, but also the voltage near the voltage regulator 300.

In one example, the VRC 100 may benefit from receiving electric power system information from the local CTs and PTs. In the event that communications between the metering device 500 and the VRC 100 are not available (e.g. lost, not received, unreliable, fail a CRC, have a quality bit set, or the like) the VRC 100 may use the local power system data as described above in conjunction with Equation 1 to estimate the remote voltage $V_{R\_est}$, and regulate the remote power system voltage based thereon. The voltage regulation module 250 may be configured to execute such a regulation algorithm. Accordingly, such a system would regulate the remote voltage using the measured remote voltages $V_R$ unless communication of such were to be compromised. In that event, the VRC 100 would revert to estimating the remote voltage using local voltages and currents and the line impedance, as described above, until the remote data is again available.

Because certain remote and local power system information is available to the VRC 100 of FIGS. 5, 7, and 8, the VRC 100 may be capable of checking the set line impedance estimate and correct such. In one example, the VRC 100 compares the difference between the measured local voltage $V_L$ and the measured remote voltage $V_R$ against the difference between the measured local voltage $V_L$ and the remote estimated voltage $V_{R\_est}$ (calculated using Equation 1, above), and updates the set line impedance estimate $Z_{line}$ using the comparison as shown in Equation 4:

$$Z_{line\_new} = Z_{line} * \frac{V_L - V_R}{V_L - V_{R\_est}} \qquad \text{Eq. 4}$$

where $Z_{line\_new}$ is the updated line impedance.

In one embodiment, instead of updating the set line impedance, the VRC 100 may be adapted to use a scaling factor k that is dependent on a ratio of the difference between the measured local voltage $V_L$ and the measured remote voltage $V_R$ and a difference between the measured local voltage $V_L$ and the remote estimated voltage $V_{R\_est}$, as according to Equations 5 and 6:

$$V_{R\_est} = V_L - k * I_L * Z_{line} \qquad \text{Eq. 5}$$

$$k = \frac{V_{L\_n-1} - V_{R\_n-1}}{V_{L\_n-1} - V_{R\_est\_n-1}} \qquad \text{Eq. 6}$$

where k is the scaling factor, $V_{R\_n-1}$ is a previous value of a measured remote voltage and $V_{R\_est\_n-1}$ is a previous value of a remote estimated voltage at a time corresponding with the time of the previous value of a measured remote voltage. The scaling factor k may be updated at each comparison of corresponding measured and estimated voltage calculations.

Figure 11:
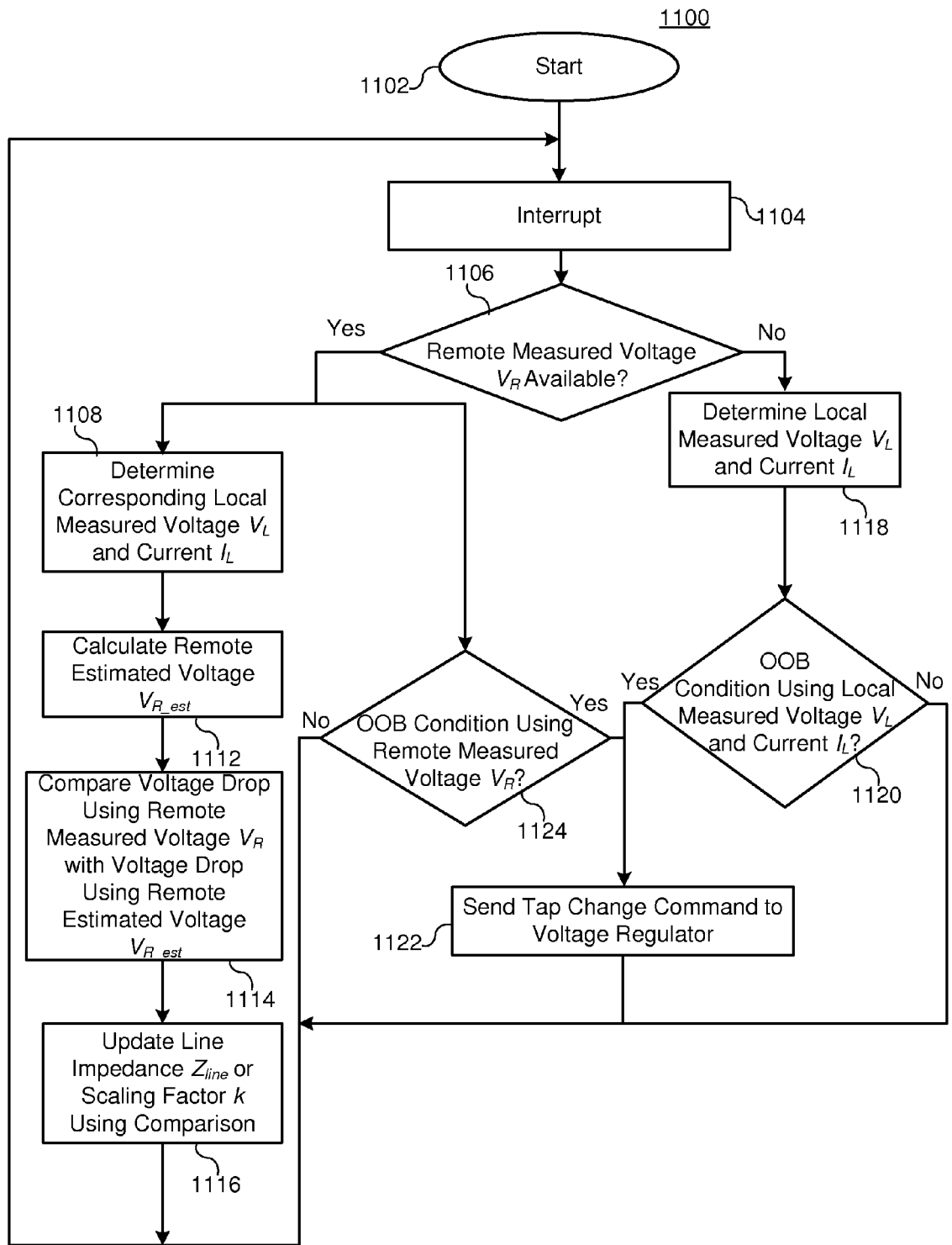

FIG. 11 illustrates a corresponding flow chart of a method 1100 wherein the VRC 100 is configured to regulate the remote voltage based on received remote voltage measurements $V_R$ when they are available and local voltage and current measurements $V_L$, $I_L$ when the remote measurements are not available. The remote measurements may not be available under conditions such as, for example, when the communications are faulty, when the measurements are judged to be unreliable, or the like.

The method 1100 starts 1102 when the voltage regulation algorithm has an interrupt 1104. As mentioned above, the voltage regulation algorithm may be configured to operate at predetermined intervals such as 16 or 32 times per power system cycle (960 or 1920 times per second on a 60 Hz electric power system). However, various other predetermined intervals are contemplated herein. Upon the interrupt 1104, the method 1100 continues by determining whether the remote measured voltage $V_R$ is available 1106. This determination may include determining whether the measurement has been received by the VRC 100, whether the communications are faulty, whether the measurement is reliable, and the like.

It is contemplated that in the event that the metering device 500 sends messages at a rate lower than the interrupt rate of the VRC 100, the data from the previous available message would be used.

If the measurement is available, then the method 1100 proceeds on two paths—one to regulate the voltage at the remote location using only the remote voltage measurement $V_R$, and the other to update the line impedance setting or scaling factor. Along the branch of regulating the voltage, the method 1100 determines 1124 whether the remote measured voltage $V_R$ is within the in band area 402 or one of the OOB areas 406 or 414. If the remote measured voltage $V_R$ is not within an OOB area 406 or 414, then the method 1100 returns to wait for the next interrupt 1104. If the remote measured voltage $V_R$ is within an OOB area 406 or 414, then the method 1100 sends a tap change command to the voltage regulator 1122, causing it to change tap position to increase or decrease the voltage as needed, thus regulating the voltage at the remote location using only the remote measured voltage $V_R$. The method then returns to wait for the next interrupt 1104.

In parallel with the voltage regulation branch, the method 1100 also determines the local voltage and current $V_L$ and $I_L$ that correspond (in time) with the received remote measured voltage $V_R$ 1108. The method 1100 uses the local voltage and current $V_L$ and $I_L$ to calculate an estimated voltage at the load $V_{R\_est}$ 1112 using, for example, Equation 1 and the set line impedance $Z_{line}$ (or a previously updated line impedance) or Equation 5 using the set line impedance $Z_{line}$ and a previously determined scaling factor k. If a scaling factor k has not yet been determined, the scaling factor k is set to unity. The method 1100 proceeds to compare the estimated line voltage drop against the measured line voltage drop 1114 by, for example, dividing the difference between the measured local voltage $V_L$ and the received measured remote voltage $V_R$ by the difference between the measured local voltage $V_L$ and the estimated remote voltage $V_{R\_est}$. The method 1100 then either updates the line impedance $Z_{line}$ setting by multiplying the previously-stored line impedance setting $Z_{line}$ by the calculated ratio or the method 1100 updates the scaling factor k to be equal to the ratio 1116. The method 1100 then returns to wait for the next interrupt 1104.

Returning now to decision 1106, if the remote measured voltage $V_R$ is not available, then the method 1100 determines the local measured voltage and current $V_L$ and $I_L$ 1118. Because the remote measured voltage $V_R$ is not available, the method 1100 regulates the remote voltage using the local measured voltage and current $V_L$ and $I_L$ and either the previously determined line impedance $Z_{line}$ or the set line impedance $Z_{line}$ and the previously determined scaling factor k to estimate the remote voltage $V_{R\_est}$ using, for example, Equation 5. The method 1100 determines whether an OOB condition exists 1120 using the remote estimated voltage $V_{R\_est}$. If an OOB condition is not detected, then the method 1100 returns to wait for the next interrupt 1104. If, however, an OOB condition is detected, then the method 1100 sends a tap change command to the voltage regulator 1122 thus regulating the remote voltage using the local voltage and current measurements $I_L$ and $V_L$ and either a previously updated line impedance value $Z_{line}$ or the set line impedance value $Z_{line}$ and the previously updated scaling factor k. The method 1100 then returns to wait for the next interrupt 1104.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A system for regulating a remote voltage of an electric power delivery system, comprising:
    a voltage regulating device operatively coupled to a local portion of the electric power delivery system and configured to regulate the remote voltage by selecting among a plurality of taps on a transformer;
    a metering device in communication with a remote portion of the electric power delivery system to obtain remote power system data, including a transmit module for transmitting the remote power system data; and,
    a voltage regulator control in communication with the voltage regulating device and the metering device, comprising:
        an input for receiving the remote power system data from the metering device; and,
        a microcontroller in operational communication with the input for receiving the remote power system data comprising a voltage regulation module for
            calculating an updated line impedance using a ratio of the remote power system data including a remote measured voltage to a remote estimated voltage;
            updating the set line impedance with the updated line impedance; and,
            producing a tap change command for the voltage regulating device upon detecting an excursion of the remote power system data from an in-band area to an out-of-band area.

2. The system of claim 1, wherein the remote power system data comprises a voltage.

3. The system of claim 1, further comprising a data channel between the voltage regulator control and the metering device, to communicate the remote power system data.

4. The system of claim 3, wherein the data channel comprises a fiber optic cable.

5. The system of claim 3, wherein the data channel comprises a wide-area network.

6. The system of claim 3, wherein the data channel comprises a radio-frequency channel.

7. The system of claim 3, wherein the data channel comprises a power line carrier.

8. The system of claim 3, wherein the data channel comprises a first serial encryption device in communication with the metering device to encrypt communications therefrom and a second serial encryption device in communication with the voltage regulator control to decrypt communications thereto.

9. The system of claim 1, wherein the voltage regulator control further comprises:
    a local voltage input for receiving local voltage measurements from the local portion of the electric power delivery system; and,
    a local current input for receiving local current measurements from the local portion of the electric power delivery system,
    wherein the voltage regulation module uses the local voltage and local current to determine the remote estimated voltage.

10. The system of claim 9, wherein the voltage regulation module further is configured to use the remote estimated voltage to regulate the voltage at the remote location when the remote power system data is not available.

11. The system of claim 9, wherein the voltage regulation module is configured to use the remote estimated voltage and the measured remote power system data to calculate a scaling factor.

12. The system of claim 11, wherein the voltage regulation module is configured to use a new local current, a new local voltage, the scaling factor, and a set line impedance to calculate a new remote estimated voltage and uses the new remote estimated voltage to regulate the voltage at the remote location when the remote power system data is not available.

13. The system of claim 1, wherein the voltage regulation module is configured to use a new local current, a new local voltage, and the updated line impedance to calculate a new remote estimated voltage, and uses the new remote estimated voltage to regulate the voltage at the remote location when the remote power system data is not available.

14. A voltage regulator control apparatus for controlling tap position change operation of a voltage regulator, the voltage regulator configured to operatively couple to a local position of an electric power delivery system to regulate a remote voltage at a remote position of the electric power delivery system, the apparatus comprising:
 a remote input for receiving remote electric power information from the remote position of the electric power delivery system; and
 a microcontroller operatively coupled to the remote input and including a voltage regulation module for
  receiving the remote electric power information,
  calculating an updated line impedance using a ratio of the remote electric power information including a remote measured voltage to a remote estimated voltage,
  updating the set line impedance with the updated line impedance, and,
  comparing the remote electric power information against predetermined thresholds to determine if the remote position of the electric power delivery system exhibits an out-of-band condition, and
  creating a tap position change command when remote position of the electric power delivery system exhibits the out-of-band condition.

15. The apparatus of claim 14, wherein the remote input for receiving is configured for communication with a metering device operatively coupled to the remote position of the electric power delivery system.

16. The apparatus of claim 14, wherein the remote electric power information comprises a remote voltage measurement.

17. The apparatus of claim 14, wherein the remote input comprises a serial port.

18. The apparatus of claim 14, wherein the remote input comprises a fiber-optic port.

19. The apparatus of claim 14, wherein the remote input comprise an Ethernet port.

20. The apparatus of claim 14, wherein the remote input comprises a radio receiver.

21. The apparatus of claim 14, wherein the remote input is in communication with a serial encryption device configured to decrypt received encrypted remote electric power information.

22. The apparatus of claim 14, further comprising a local input for receiving local electric power information from the local position of the electric power delivery system.

23. The apparatus of claim 22, wherein the microcontroller is operatively coupled to the local input and the voltage regulation module is configured to calculate the remote estimated voltage using the line impedance value and the local electric power information including local measured current and local measured voltage.

24. The apparatus of claim 23, wherein the voltage regulation module is configured to regulate the remote voltage using the remote estimated voltage when the remote electric power information is not available.

25. The apparatus of claim 23, wherein the voltage regulation module is configured to regulate the remote voltage using the updated line impedance, a new local measured current and a new local measured voltage when the remote electric power information is unavailable.

26. The apparatus of claim 23, wherein the voltage regulation module is configured to calculate a scaling factor using the remote estimated voltage and the remote electric power information including a remote measured voltage.

27. The apparatus of claim 26, wherein the voltage regulation module is configured to regulate the remote voltage using a new local measured current, a new local measured voltage, the set line impedance, and the scaling factor when the remote electric power information is not available.

28. A method for regulating a voltage at a remote location of an electric power delivery system using electric power system information from the remote location and a voltage regulator at a local location of the electric power delivery system, comprising:
 receiving remote electric power system information from the remote location by an intelligent electronic device at the local location in operational communication with a voltage regulator;
 calculating an updated line impedance using a ratio of the remote electric power system information including a remote measured voltage to a remote estimated voltage;
 updating the set line impedance with the updated line impedance; and,
 the intelligent electronic device comparing the remote electric power system information against a first threshold to detect a first out-of-band condition at the remote location; and,
 the intelligent electronic device upon detecting the first out-of-band condition, sending a command to the voltage regulator to change a tap position to regulate the remote voltage.

29. The method of claim 28, further comprising the steps of:
 comparing the remote electric power system information against a second threshold to determine if a second out-of-band condition exists; and,
 upon detecting the second out-of-band condition, sending a command to the voltage regulator to change a tap position to regulate the remote voltage.

30. The method of claim 28, further comprising the steps of:
 measuring the remote electric power system information at the remote location by a metering device at the remote location; and,
 transmitting the remote electric power system information to the intelligent electronic device at the local location.

31. The method of claim 30, wherein the step of transmitting comprises formatting a message according to a communication protocol, the message including the remote electric power system information.

32. The method of claim 30, wherein the step of transmitting the remote electric power system information further comprises the step of encrypting the electric power system information.

33. The method of claim 28, further comprising the steps of:
- measuring a local current at the local position by the intelligent electronic device;
- measuring a local voltage at the local position by the intelligent electronic device; and
- calculating the remote estimated voltage using the local current, the local voltage, and a set line impedance.

34. The method of claim 33, further comprising the step of:
- when the remote electric power system information is not available, comparing the remote estimated voltage against the first threshold to detect the first out-of-band condition at the remote location.

35. The method of claim 33, further comprising the step of:
- calculating a new remote estimated voltage using a new local current measurement, a new local voltage measurement, and the updated line impedance; and
- when the remote electric power system information is not available, comparing the new remote estimated voltage against the first threshold to detect the first out-of-band condition at the remote location.

36. The method of claim 33, further comprising the steps of:
- calculating the scaling factor by determining a ratio of the remote electric power system information including the remote measured voltage to the remote estimated voltage.

37. The method of claim 36, further comprising the steps of:
- calculating a new remote estimated voltage using a new local current measurement, a new local voltage measurement, the set line impedance, and the scaling factor; and
- when the remote electric power system information is not available, comparing the new remote estimated voltage against the first threshold to detect the first out-of-band condition at the remote location.

* * * * *